(12) United States Patent
Shiraishi et al.

(10) Patent No.: US 7,627,200 B2
(45) Date of Patent: Dec. 1, 2009

(54) OPTICAL DEVICE

(75) Inventors: Takashi Shiraishi, Kawasaki (JP); Tetsu Hasegawa, Kawasaki (JP); Masaharu Doi, Kawasaki (JP); Kazuhiro Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/554,924

(22) Filed: Oct. 31, 2006

(65) Prior Publication Data
US 2007/0280580 A1   Dec. 6, 2007

(30) Foreign Application Priority Data
May 31, 2006 (JP) .............................. 2006-151168

(51) Int. Cl.
*G02F 1/035* (2006.01)
(52) U.S. Cl. ................................. 385/2; 385/3; 385/40
(58) Field of Classification Search ........................ None
See application file for complete search history.

(56) References Cited

U.S. PATENT DOCUMENTS

| 5,185,823 | A  | * | 2/1993  | Kaku et al. .................... 385/2 |
| 5,342,648 | A  | * | 8/1994  | MacKenzie et al. ......... 427/126.3 |
| 5,388,170 | A  | * | 2/1995  | Heismann et al. ............. 385/4 |
| 5,949,944 | A  | * | 9/1999  | Minford et al. ............. 385/131 |
| 5,982,958 | A  |   | 11/1999 | Minowa et al. |
| 6,198,855 | B1 | * | 3/2001  | Hallemeier et al. ............ 385/2 |
| 6,363,189 | B1 | * | 3/2002  | Minakata et al. ............. 385/41 |
| 6,480,633 | B1 | * | 11/2002 | Fleming et al. ............... 385/2 |
| 7,231,101 | B2 | * | 6/2007  | Nagata ........................ 385/2 |
| 7,343,055 | B2 | * | 3/2008  | McBrien et al. .............. 385/2 |
| 2003/0128930 | A1 | * | 7/2003 | Burns et al. .................. 385/40 |
| 2003/0174920 | A1 | * | 9/2003 | Kawano et al. ................ 385/3 |
| 2004/0061918 | A1 | * | 4/2004 | Pruneri et al. ............... 359/245 |

FOREIGN PATENT DOCUMENTS

| EP | 1271221 A1 | * | 1/2003 |
| JP | 5-78016    |   | 10/1993 |
| JP | 2873203    |   | 1/1999 |

OTHER PUBLICATIONS

H. Haga et al. LiNbO3 traveling-wave light modulator/switch with an etched groove. IEEE Journal of Quantum Electronics, QE-22:6, 902, Jun. 1986.*

Shintaro Miyazawa, "Ferroelectric domain inversion in Ti-diffused $LiNbO_3$ optical waveguide", J. Appl. Phys., vol. 50, No. 7, Published Jul. 1979, pp. 4599-4603.

* cited by examiner

*Primary Examiner*—Mike Stahl
(74) *Attorney, Agent, or Firm*—Fujitsu Patent Center

(57) ABSTRACT

Optical waveguides (A) and (B) of a Mach-Zehnder modulator is normally formed on a –Z plane as an electric polarization non-inversion area. However, when the signal electrode 11 and the ground electrode 10 are provided asymmetrically on two waveguides, chirp occurs in output light, which is undesired. Therefore, these electrodes are provided symmetrically about the two waveguides. To effectively perform optical modulation, a part of the substrate in which an optical waveguide exists is to be electric polarization-inverted. As a result of the electric polarization inversion the optical waveguide is on the +Z plane. However, electric charge is accumulated on the +Z plane from unstable spontaneous electric polarization of an electric polarization inversion area, and has undesired influence on the performance of the optical modulator. Therefore, a conductive amorphous layer is formed on the surface of the electric polarization inversion area.

24 Claims, 8 Drawing Sheets

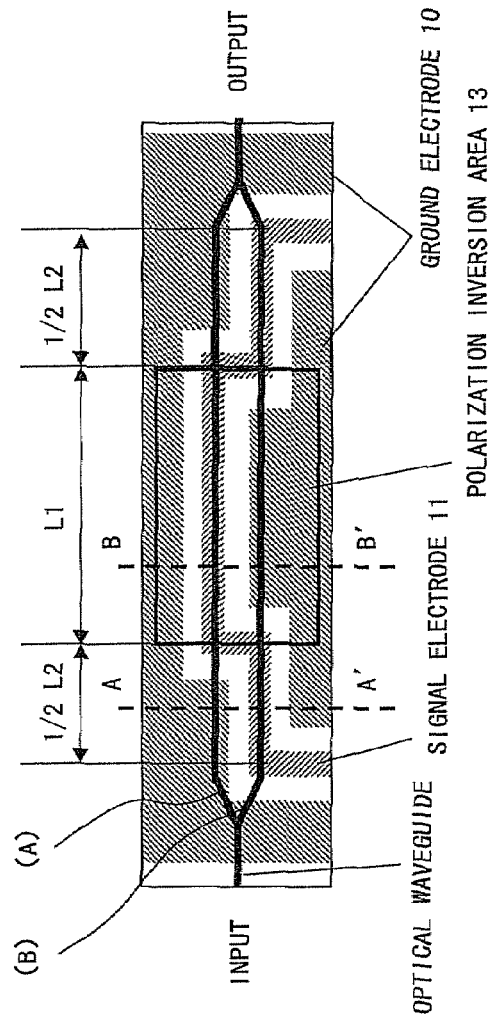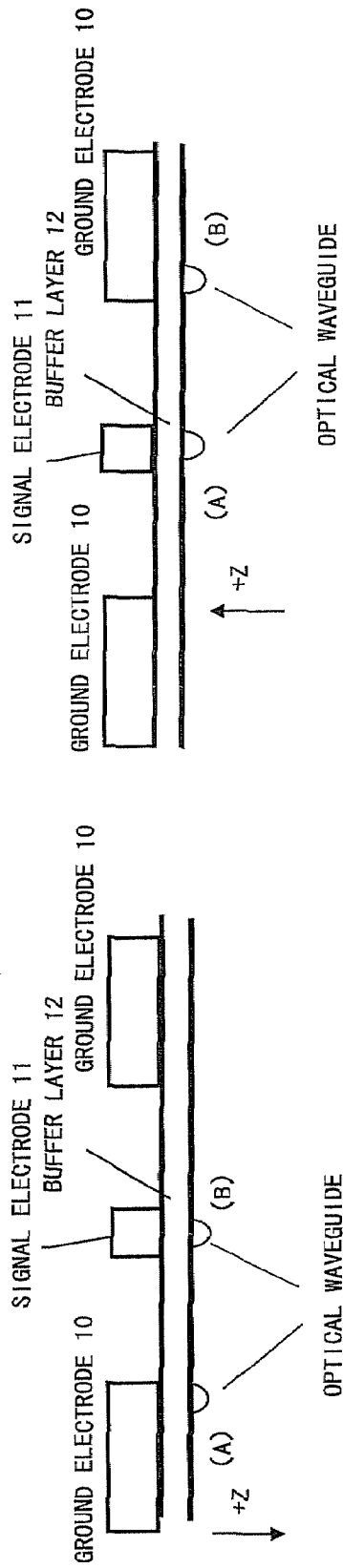
FIG. 1A PRIOR ART
FIG. 1B PRIOR ART
FIG. 1C PRIOR ART

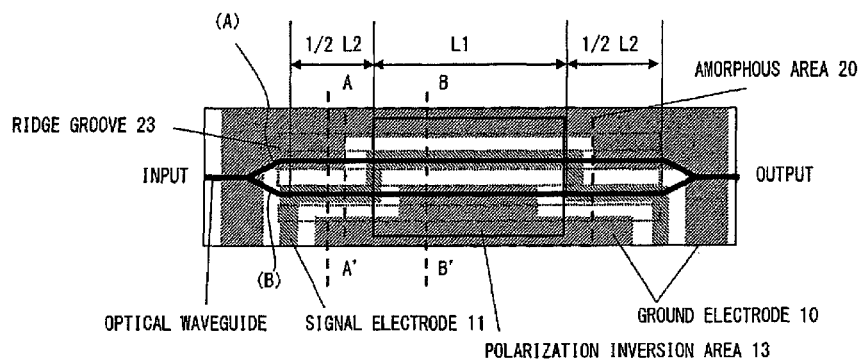
F I G. 6 A
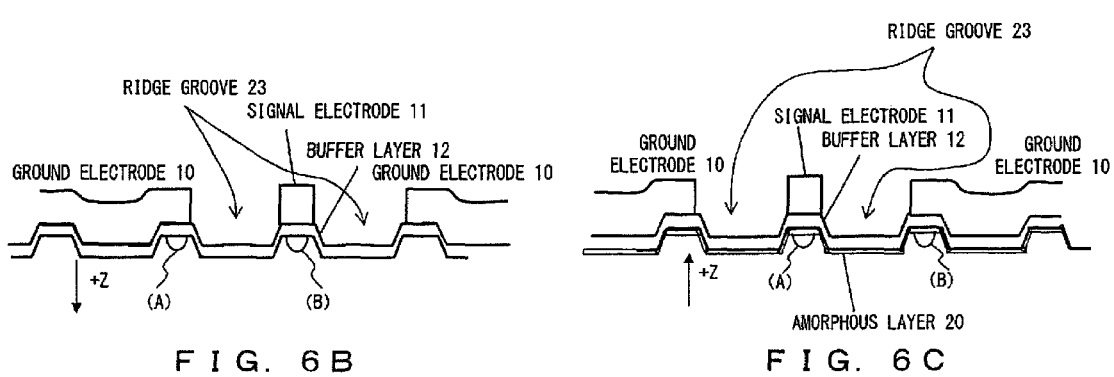
F I G. 6 B
F I G. 6 C

OPTICAL DEVICE

BACKGROUND OF THE INVENTION

1. Field of the Invention

The present invention relates to an optical device using a waveguide in optical communications, and more specifically to an optical modulator.

2. Description of the Related Art

FIG. 1A shows the configuration of a conventional Mach-Zehnder modulator.

The modulator includes optical waveguides (A) and (B), and coplanar (CPW) electrodes 10 and 11. The electrode includes the signal electrode 11 and the ground electrode 10 on both sides of the signal electrode 11, and an electric polarization inversion area 13 is formed at the central portion. In this portion, an optical waveguide is formed on the +Z plane. A substrate is a Z-cut lithium niobate (LiNbO3), and SiO2 is formed as a buffer layer 12 for suppressing the optical absorption by the electrode between the substrate and the electrode. Although not shown in FIG. 1, it is preferable to form Si film on $SiO_2$ to suppress the temperature drift by electric charge held between the buffer layers because of pyroelectric effect.

The optical modulator using an electro-optical crystal such as a LiNbO3 substrate, etc. is formed by providing a metal film on a part of the crystal substrate, forming an optical waveguide by heat diffusion or proton exchange in a benezenecarboxylic acid after patterning, and providing electrodes near the optical waveguide. At this time, to prevent the optical absorption by the electrode, an insulating film such as $SiO_2$, etc. as a buffer layer is formed between the electrode and the substrate. Normally, an optical waveguide is formed on the −Z plane of crystal because, for example, when a waveguide is formed on the +Z plane in the LiNbO3 crystal, there is an unstable phenomenon of domain inversion occurring on the surface. Such a phenomenon is well known as described in the non-patent document 1, etc. In this example, the +Z plane is a plane uniquely determined by the crystal having spontaneous electric polarization. The spontaneous electric polarization direction is defined as a Z direction, the plane having a waveguide of an electric polarization inversion area in the example shown in FIG. 1 is a +Z plane, and the non-inversion area is a −Z plane. After forming an optical waveguide on the −Z plane, a strong electric field is applied to the substrate, thereby inverting the electric polarization direction of the −Z plane and obtaining a +Z plane.

When an optical modulator is driven at a high speed, the terminals of a signal electrode and a ground electrode are connected by a resistor to obtain a traveling wave electrode, and a microwave signal is applied from the input side. At this time, the refractive indexes of the parallel waveguides (A) and (B) are changed by an electric field into $+\Delta na$ and $-\Delta nb$ respectively, and the phase difference between the parallel waveguides (A) and (B) is changed, thereby outputting an intensity-modulated signal light from an output waveguide. By changing the shape of the section of the electrode, the effective refractive index of a microwave can be controlled, and by adjusting the speed between the light and microwave, a broadband optical response characteristic can be obtained. However, since the absolute values of the electric field to be applied to the parallel waveguides (A) and (B) are different so that $\Delta na < \Delta nb$, a phenomenon (chirp) of changing the wavelength of an output light during the transition from the ON status to the OFF status is generated. To solve this problem, the substrate electric polarization inverted in a part of an area is used. A signal electrode is designed to pass on the waveguide (A) in a non-inversion area, and on the waveguide (B) in an inversion area. In FIG. 7, when L1=L2, the light passing the waveguides (A) and (B) respectively change in phase by $+\Delta\theta s$ and $-\Delta\theta g$ in the non-inversion area, and by $+\Delta\theta g$ and $-\Delta\theta s$ in the inversion area. The $\Delta\theta g$ and $\Delta\theta s$ respectively indicates the amount of phase change of the light by the ground electrode 10 and the signal electrode 11. Therefore, the phases of the light passing the waveguides (A) and (B) change in the Y branch waveguide on the output side respectively by $+(\Delta\theta s+\Delta\theta g)$ and $-(\Delta\theta s+\Delta\theta g)$, thereby performing a phase modulation with equal absolute values and inverted signs. Therefore, the wavelength chirp can be set to 0. Additionally, the amount of chirp can be adjusted by changing the ratio between the L1 and L2.

FIG. 1A is a top view of an optical modulator. FIG. 1B is a sectional view along the ling A-A' of the optical modulator shown in FIG. 1A. Since the electric polarization of a substrate is a non-inversion area, the plane on which the optical waveguides (A) and (B) are provided is the −Z plane. That is, the direction of the +Z plane which is the direction of electric polarization is downward. The buffer layer 12 is provided on the optical waveguides (A) and (B) provided on the substrate, and the ground electrode 10 and the signal electrode 11 are provided on the buffer layer 12. FIG. 1C is a sectional view along the line B-B' of the optical modulator shown in FIG. 1A. Since the electric polarization of the substrate in this portion is an inversion area, the plane on which the optical waveguides (A) and (B) are provided is the +Z plane. That is, the direction of the +Z plane as the direction of the electric polarization is upward. The buffer layer 12 is provided on the optical waveguides (A) and (B) provided on the substrate, and the ground electrode 10 and the signal electrode 11 are provided on the buffer layer 12.

When an optical modulator having the above-mentioned electric polarization inversion structure is used, the +Z plane of the crystal is necessarily used. However, as a result of detailed reliability test, we have found the phenomenon that the operation point of a modulator using the +Z plane greatly changes (changed by several 10V's) by adding a temperature test such as a heat cycle, etc. An operation point of a modulator depends on the phase difference between the parallel waveguides (A) and (B) shown in FIG. 1A, and a shift has a large undesired influence on the transmission characteristic, For a countermeasure against these problems, the techniques described in the patent documents 1 and 2 have been developed.

[Non-patent Document 1] S. Miyazawa, J. Appl. Phys., Vol. 50, No. 7, 1979

[Patent Document 1] Specification of Japanese Patent No. 02873203

[Patent Document 2] Japanese Patent Publication No. H05-078016

However, as an experiment result, the following points have been clearly indicated.

An operation point has changed on the +Z plane.

A change occurs when the +Z plane is used regardless of how performing a producing step.

The problems cannot be solved in the reliability establishing method for the temperature drift of the optical modulator generated by a conventional pyroelectric effect.

The conventional countermeasure against the temperature drift is explained below by referring to FIGS. 2A and 2B.

As shown in FIG. 2A, electric charge is generated on a strong dielectric crystal when a temperature changes. It is referred to as pyroelectric effect. By distributing the electric charge to the buffer layer 12 which is an insulating film asymmetrically about the optical waveguides (A) and (B), the phase asymmetrically changes between the two waveguides by the electric field formed by the electric charge, thereby causing a temperature drift. Thus, a method of symmetrically distributing electric charge by forming a conductive film 15 on the top surface of the buffer layer 12 as shown in FIG. 2B is well known.

However, since the degradation phenomenon found in the above-mentioned experiment cannot be completely solved in the method shown in FIGS. 2A and 2B, a new solving method is demanded.

SUMMARY OF THE INVENTION

The present invention aims at providing an optical device having an electric polarization inversion area and capable of effectively preventing the occurrence of the degradation of performance caused by the feature of an electric polarization inversion area.

The optical device according to the present invention includes: a dielectric substrate having spontaneous electric polarization, and a non-inversion area and an inversion area of the spontaneous electric polarization; an optical waveguide formed over a −Z plane of the non-inversion area and a +Z plane of the inversion area; an electrode formed near the optical waveguide; and a conductive layer provided on the plane covering at least the optical waveguide near the surface of the inversion area.

The present invention can provide an optical device capable of effectively preventing the occurrence of the degradation of performance by a temperature drift although an electric polarization inversion area is included.

BRIEF DESCRIPTION OF THE DRAWINGS

FIGS. 1A through 1C show the configuration of the conventional Mach-Zehnder modulator;

FIGS. 6A through 6C show the fourth examples of the configurations of the optical modulator according to a mode for embodying the present invention;

DESCRIPTION OF THE PREFERRED EMBODIMENTS

Figure 2A:
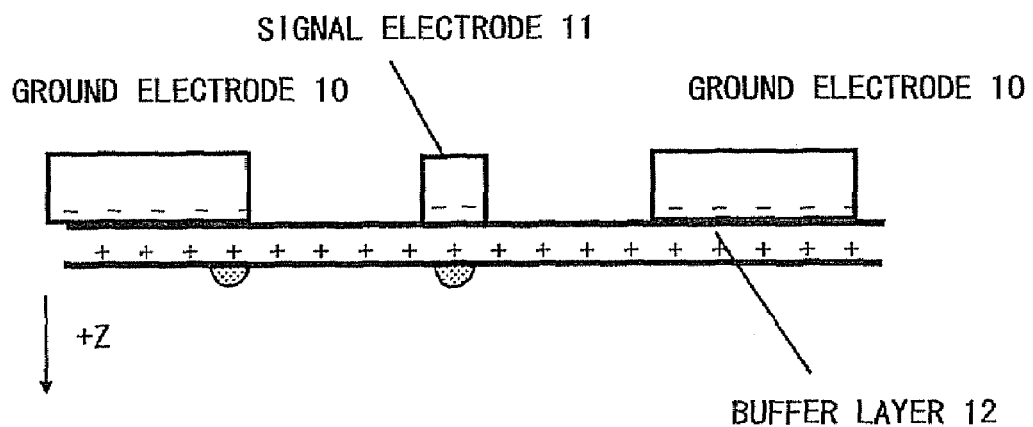
FIGS. 2A and 2B are explanatory views of a conventional countermeasure against a temperature drift.
Figure 2B:
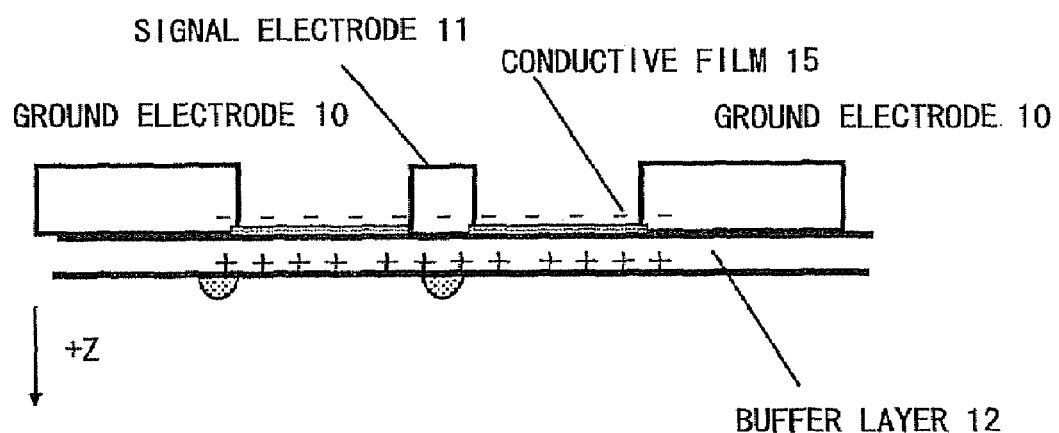

The degradation phenomenon found in the above-mentioned experiment cannot be completely solved by the conventional technology shown in FIG. 2B. Therefore, it is estimated that the electric charge is accumulated in the crystal on the +Z plane, thereby causing a phase change in an optical waveguide portion and then the fluctuation in operation point. It is considered that the problem is caused by the unstable spontaneous electric polarization on the +Z plane. We have devised the method of forming a conductive layer near the surface of the +Z plane to stabilize the spontaneous electric polarization. The basic effect can be obtained from any material of the conductive layer, but it is preferable to have less absorption of light. That is, it is desired that effective means as a conductive layer does not generate an optical loss or change the application efficiency of an electric field. We have devised the method of forming an amorphous layer of the material of the substrate or the material having similar property as a substance that satisfies the conditions. For example, an effective material of the amorphous layer can be, $LiNbO_3$, $LiTaO_3$, $BaTiO_3$, etc.

The effect of leveling the distribution of the electric charge accumulated on the +Z plane, and suppressing the fluctuation of the operation point of an optical modulator is considered to be obtained as follows. That is, when the electric charge is unevenly distributed on the +Z plane, the intensity of the electric field effectively applied to two optical waveguides is different when an electric field is applied from an electrode, thereby indicating different amounts of phase change between the two optical waveguides. As a result, chirp is generated or an operation point is moved. If the distribution of electric charge is uniform, the strength of an effective electric field applied to the two optical waveguides changes at the same level. Therefore, the amount of phase modulation applied by two optical waveguides to light does not relatively change. Therefore, no chirp is generated or an operation point does not move. When the electric charge is accumulated on the +Z plane due to unstable spontaneous electric polarization, an undesired influence can be removed by making the charge distribution homogeneous. If a conductive layer is formed near the surface of the +Z plane, the conductive layer is placed at constant electric potential. Therefore, the electric charge accumulated on the +Z plane is attracted at the constant electric potential of the conductive layer, thereby maintaining the distribution of the electric charge at a constant level. As a result, since the distribution of the electric charge accumulated on the +Z plane is constant, an undesired influence on the operation of an optical modulator can be removed.

The amorphous layer is in an amorphous state with the crystal lattice of the substrate disturbed, the material of the crystal layer is the same but different in characteristic, has no spontaneous electric polarization, and indicates higher conductivity than the crystal layer. We have found as a result of an experiment that the operation point of an optical modulator is stable for a heat cycle by having a very thin amorphous layer (having a thickness of about 5~1000 Å for which an amorphous layer does not lower the electric field from an electrode, or sufficient modulation can be applied to light) on the +Z plane surface. Additionally, since the amorphous layer has the characteristic similar to that of the substrate, no optical absorption occurs even when it is directly formed on the surface of the substrate, thereby causing a transmission loss. Furthermore, since a desired effect can be expected by forming only a very thin layer, the efficiency of applying an electric field does not change.

Figure 3A:
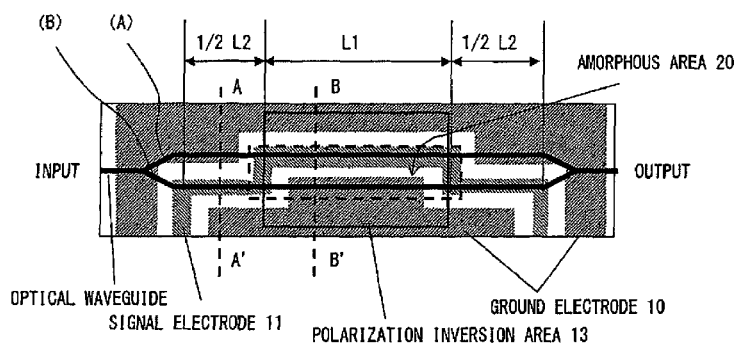
FIGS. 3A through 3C show examples of the configurations of the optical modulator according to a mode for embodying the present invention.
Figure 3B:
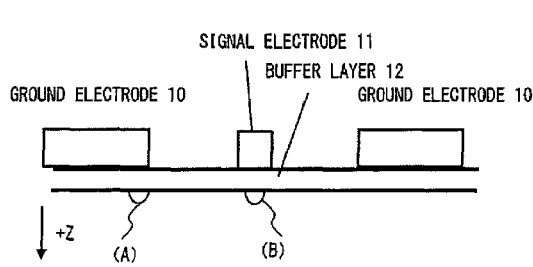
Figure 3C:
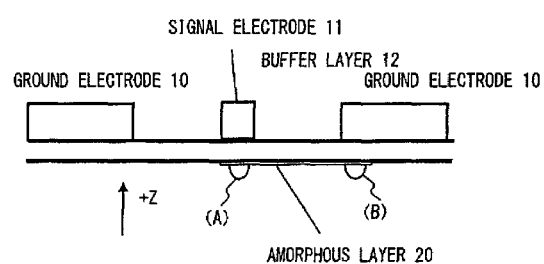

FIGS. 3A through 3C show examples of the configuration of the optical modulator according to a mode for embodying the present invention.

The components also shown in FIGS. 1A through 1C are assigned the same reference numerals, and the explanation thereof is omitted here.

The top view in FIG. 3A is similar to that in FIG. 1A, but an amorphous layer is formed between the buffer layer and the substrate on the +Z plane. In the sectional view along the line A-A' shown in FIG. 3B, since the portion is a non-inversion area of electric polarization, no amorphous layer is provided. Since the portion in the sectional view at the line B-B' shown in FIG. 3C is an inversion area of electric polarization, an amorphous layer is provided to cover the top surface of the optical waveguides (A) and (B). Although an amorphous layer is provided as the most preferable example in a mode for embodying the present invention, it is only necessary that the layer has conductivity.

An amorphous layer is more effective when it is thicker, but since the amorphous portion has little electro-optic effect, there occurs degradation in modulation efficiency when it is extremely thick. Therefore, according to our experiment, the desired thickness is 5~1000 Å.

Figure 4A:
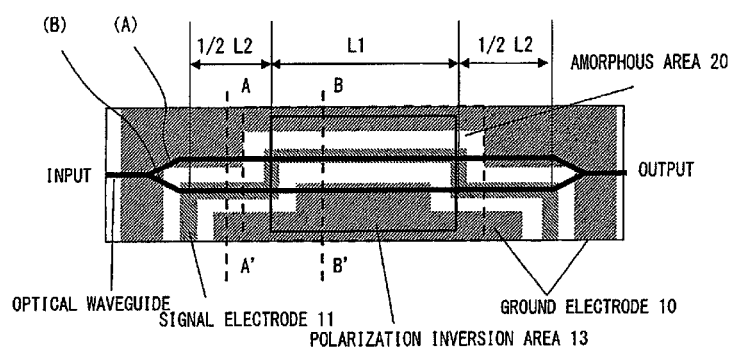
FIGS. 4A through 4C show the second examples of the configurations of the optical modulator according to a mode for embodying the present invention.
Figure 4B:
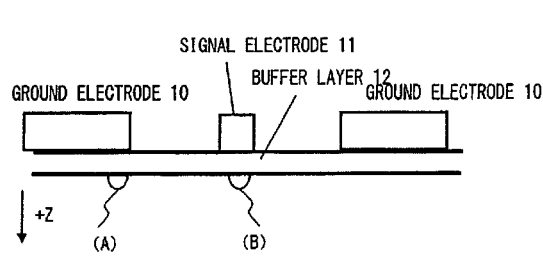
Figure 4C:
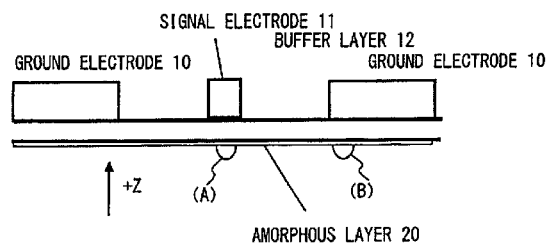

FIGS. 4A through 4C show the second example of the optical modulator according to a mode for embodying the present invention.

The same components also shown in FIGS. 3A through 3C are assigned the same reference numerals, and the explanation thereof is omitted here.

Although an amorphous layer is effective by covering the waveguide portion on the +Z plane, the largest effect can be expected when the entire +Z plane is covered. That is, since the capacity of the amorphous layer as the earthing is larger when the area of the amorphous layer as a conductive layer becomes larger, the capability of leveling the distribution of the electric charge accumulated on the +Z plane becomes larger. Therefore, an amorphous layer is provided to cover the entire surface of the electric polarization inversion area as shown in the sectional view along the line B-B' in FIG. 4C.

Figure 5A:
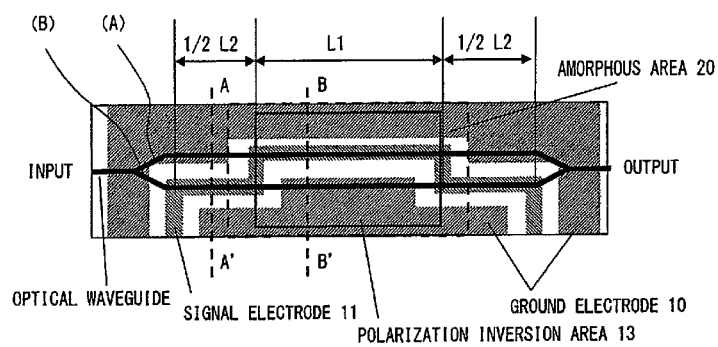
FIGS. 5A through 5C show the third examples of the configurations of the optical modulator according to a mode for embodying the present invention.
Figure 5B:
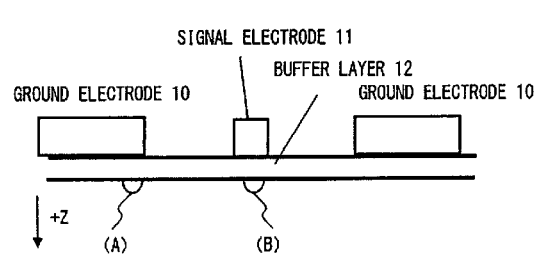
Figure 5C:
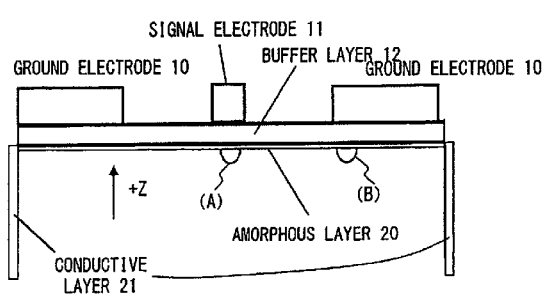

FIGS. 5A through 5C show examples of the third configuration of the optical modulator according to a mode for embodying the present invention.

The same reference numerals are assigned to the components also shown in FIGS. 3A through 3C, and the explanation thereof is omitted here.

A larger effect can be expected by forming a conductive layer 21 on the side of the substrate and is allowed to contact an amorphous layer 20. That is, the conductive layer 21 and the amorphous layer 20 are incorporated into one unit and functions as the earthing, thereby leveling the distribution of the electric charge generated on the +Z plane on the earthing having a larger capacity, and improving the effect of the present invention. As the conductive layer 21 on the side portion, Si and Ti are excellent because there is no influence on an optical loss. Furthermore, it is preferable that the conductive layer 21 on the side portion is grounded. By grounding the conductive layer 21, the effect as an earthing can be improved, and by providing the conductive layer 21 on the side portion, the wiring for an earthing can be easily connected.

FIGS. 6A through 6C show examples of the fourth configuration of the optical modulator according to a mode for embodying the present invention.

The components also shown in FIGS. 3A through 3C are assigned the same reference numerals, and the explanation thereof is omitted here.

In the case of an optical modulator of 40 Gbit/s requiring a broad band, the substrate on both sides of the optical waveguide is lowered (ridge groove 23) as a ridge structure. The ridge groove 23 is typically formed in the RIE (reactive ion etching) method. The present invention is also effective when an optical modulator of 40 Gbit/s provided with an electric polarization inversion area. As shown in FIGS. 6A and 6C, the amorphous layer 20 is formed on the +Z plane. It is not necessary that the amorphous layer 20 is amorphous, but any conductive layer is acceptable.

Figure 7:
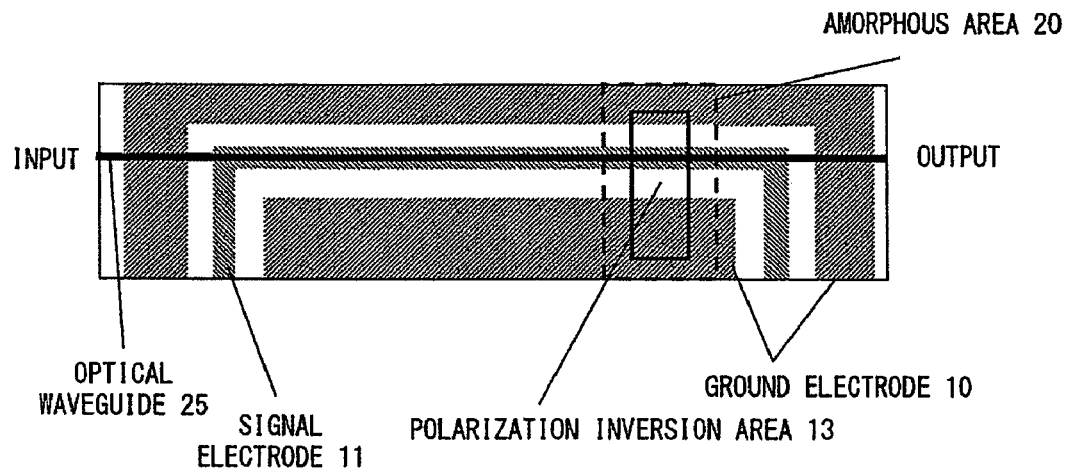
FIG. 7 shows the fifth examples of the configurations of the optical modulator according to a mode for embodying the present invention.

FIG. 7 shows an example of the fifth configuration of the optical modulator according to a mode for embodying the present invention.

The components also shown in FIGS. 3A through 3C are assigned the same reference numerals, and the explanation thereof is omitted here.

FIGS. 3A through 6C show examples of the configuration of the Mach-Zehnder modulator. However, since the present invention solves the undesired influence caused by the optical phase change on the +Z plane against a temperature change, the effect works also on the phase modulator. FIG. 7 shows the case where the present invention is applied to the phase modulator. The phase modulator shown in FIG. 7 modulates the optical phase by applying the RF voltage by arranging the electrode directly on an optical waveguide 25. With the modulator, for example, the technology of leveling the modulation band in the low frequency area by inverting electric polarization in part as shown in FIG. 7 is known. Thus, when a modulation band is leveled in the low frequency area, the transmission efficiency is improved. Therefore, in the phase modulator, the configuration of providing an electric polarization inversion area is used as shown in FIG. 7.

As a method of forming the amorphous layer 20, it is also possible to directly forming a layer in a substrate by emitting an electronic beam other than forming it on the surface in the developing method by a sputter. In this case, the inside of the substrate including a waveguide area is an amorphous layer. In this case, the effect of the present invention also works sufficiently.

The present invention can also be effective using a conductive layer instead of an amorphous layer. An example of a conductive layer can be a thin metal film of Ti, Au, Pt, etc. and a transparent conductive film of ITO, ZnO, etc. However, since the conductive films of these types have optical absorption more or less, it is necessary to carefully consider the thickness of a film, etc.

Figure 8B:
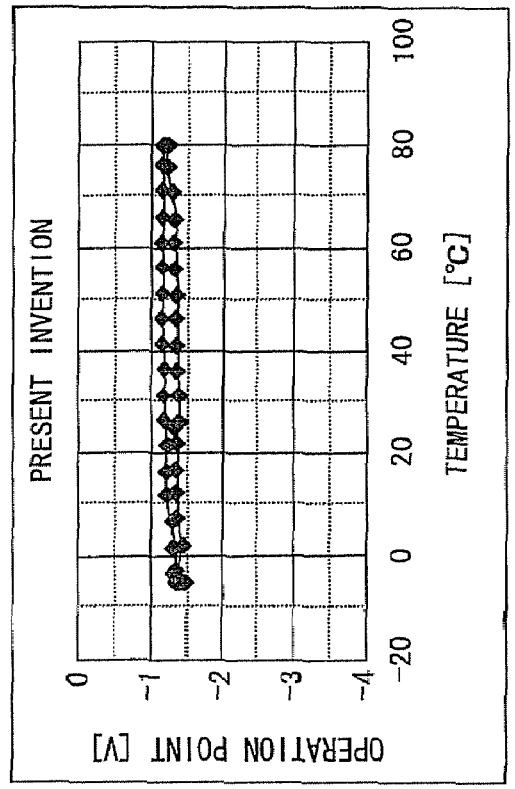
FIGS. 8A and 8B show the comparison of the operation point change experiment in the temperature cycle between the conventional modulator and the modulator according to the present invention.
Figure 8A:
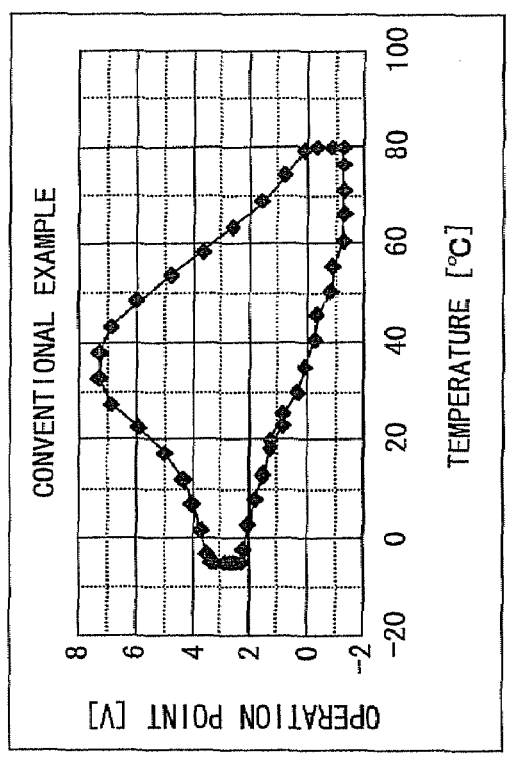

FIGS. 8A and 8B show the comparison of the experiment about the fluctuation of an operation point in the temperature cycle of the modulator between the conventional modulator and the modulator according to the present invention.

FIG. 8A shows the case of the conventional modulator. FIG. 8B shows the case of the modulator according to the present invention.

The temperature cycle shows a change in operation point for a change in temperature when the temperature cycle of 100 cycles at −5° C.~80° C. The conventional modulator and the modulator according to the present invention are formed in the same process and structure other than the thickness of the amorphous layer of 100 Å, but the present invention indicates an outstanding characteristic. That is, the fluctuation of an operation point of about 8V occurs in the conventional technology while the fluctuation of an operation point of less than 1V occurs in the present invention.

The configuration according to the mode for embodying the present invention can also be used with the conventional configuration shown in FIG. 2B, and can expect a larger effect.

What is claimed is:

1. An optical device, comprising:
a dielectric substrate having spontaneous electric polarization, and a non-inversion area and an inversion area of the spontaneous electric polarization;
an optical waveguide formed over a z plane of the non-inversion area and a +Z plane of the inversion area;
an electrode formed near the optical waveguide; and
a conductive layer provided on a plane covering at least the optical waveguide near a surface of the inversion area, wherein the conductive layer is an amorphous layer made of $LiNbO_3$, $LiTaO_3$, or $BaTiO_3$.

2. The device according to claim 1, wherein the conductive layer covers an entire inversion area.

3. The device according to claim 1, wherein an additional conductive layer is formed on a side of the substrate, and connected to the conductive layer.

4. The device according to claim 3, wherein a portion provided at a side of the substrate of the conductive layer is grounded.

5. The device according to claim 1, wherein the substrate is constituted by a $LiNbO_3$ crystal.

6. The device according to claim 1, wherein the device is made by forming an optical waveguide on a +Z plane of the substrate by inverting spontaneous electric polarization of the substrate after forming an optical waveguide on a −Z plane of the substrate.

7. The device according to claim 1, wherein a groove is provided near the optical waveguide.

8. The device according to claim 1, wherein an insulating layer is provided as a buffer layer between the conductive layer and the electrode.

9. The device according to claim 8, wherein a conductive film is provided on the buffer layer.

10. The device according to any of claims 2 through 9, wherein the optical device is an optical modulator.

11. The device according to claim 10, wherein the optical modulator is a Mach-Zehnder modulator.

12. The device according to claim 10, wherein the optical modulator is an optical phase modulator.

13. An optical device, comprising:
a dielectric substrate having spontaneous electric polarization, and a non-inversion area and an inversion area of the spontaneous electric polarization;
an optical waveguide formed over a −Z plane of the non-inversion area and a +Z plane of the inversion area;
an electrode formed near the optical waveguide; and
a conductive layer provided on a plane covering at least the optical waveguide near a surface of the inversion area, wherein the conductive layer is an amorphous layer with a thickness of 5~1000 Å.

14. The device according to claim 13, wherein the conductive layer covers an entire inversion area.

15. The device according to claim 13, wherein an additional conductive layer is formed on a side of the substrate, and connected to the conductive layer.

16. The device according to claim 15, wherein a portion provided at a side of the substrate of the conductive layer is grounded.

17. The device according to claim 13, wherein the substrate is constituted by a $LiNbO_3$ crystal.

18. The device according to claim 13, wherein the device is made by forming an optical waveguide on a +Z plane of the substrate by inverting spontaneous electric polarization of the substrate after forming an optical waveguide on a −Z plane of the substrate.

19. The device according to claim 13, wherein a groove is provided near the optical waveguide.

20. The device according to claim 13, wherein an insulating layer is provided as a buffer layer between the conductive layer and the electrode.

21. The device according to claim 20, wherein a conductive film is provided on the buffer layer.

22. The device according to any of claims 14 through 21, wherein the optical device is an optical modulator.

23. The device according to claim 22, wherein the optical modulator is a Mach-Zehnder modulator.

24. The device according to claim 22, wherein the optical modulator is an optical phase modulator.

* * * * *